Jan. 18, 1949.  E. P. KINNE  2,459,772
FIFTH WHEEL
Filed Sept. 25, 1944  4 Sheets-Sheet 1
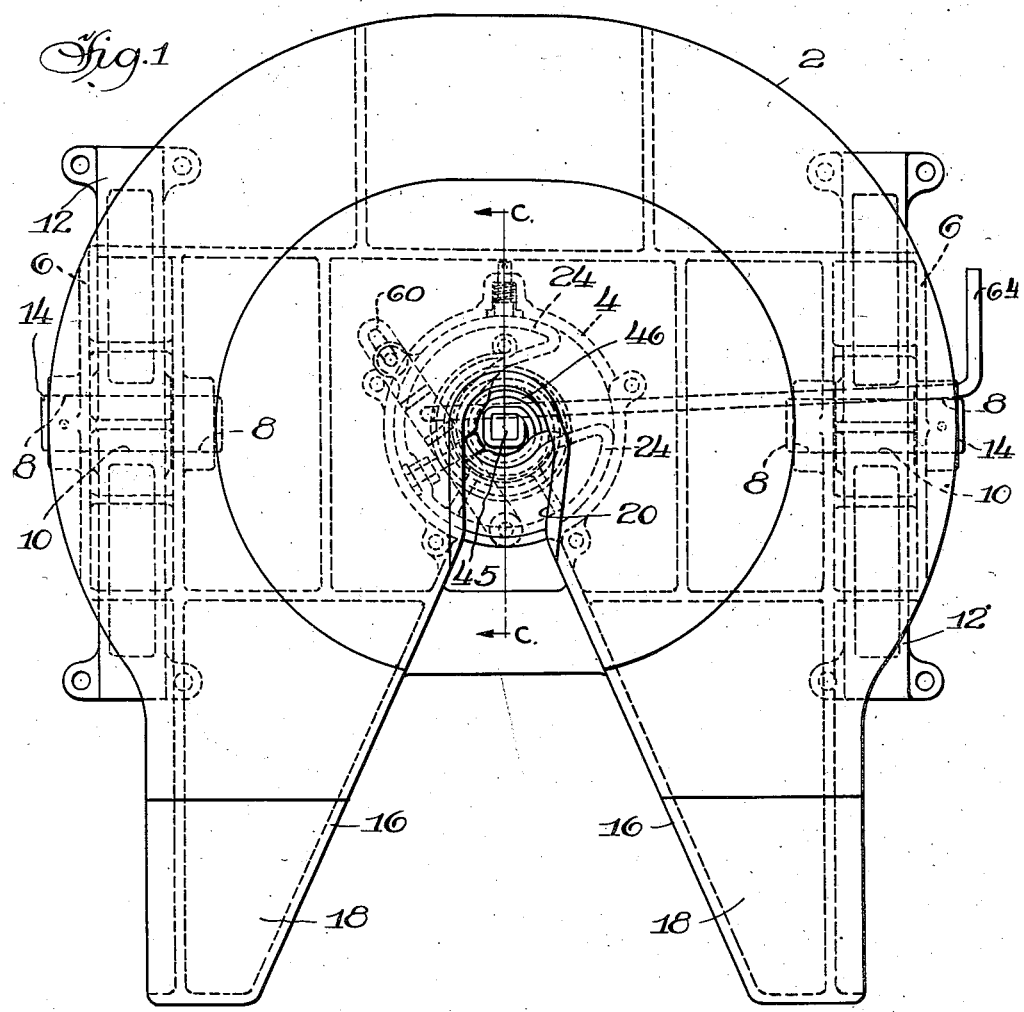
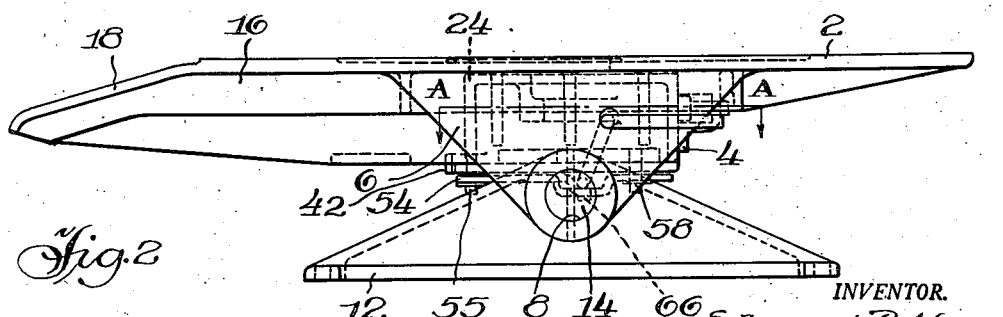
INVENTOR.
Edmund P. Kinne
BY
Atty.

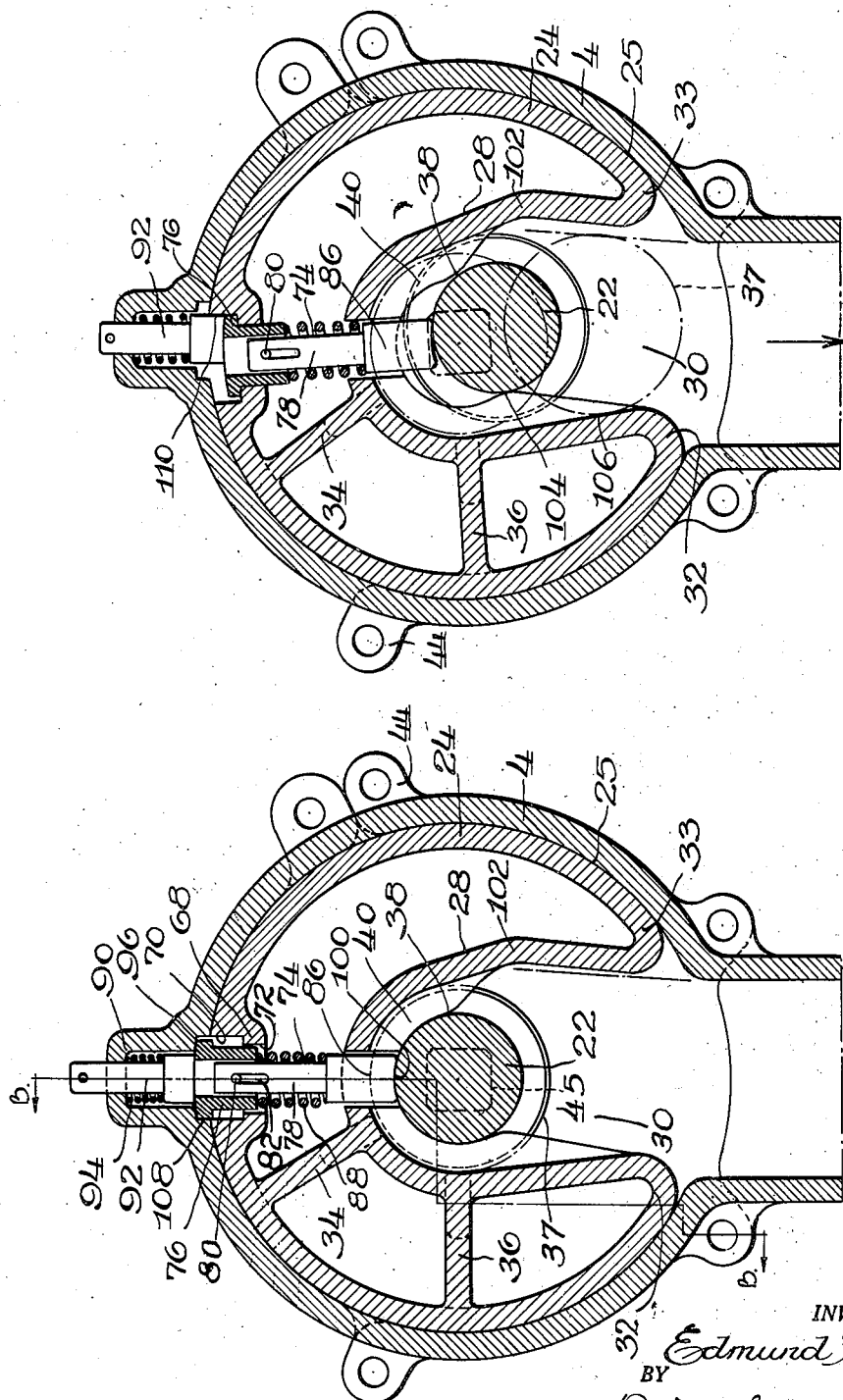

Jan. 18, 1949.   E. P. KINNE   2,459,772
FIFTH WHEEL
Filed Sept. 25, 1944   4 Sheets-Sheet 3

INVENTOR.
Edmund P. Kinne,
BY
Atty.

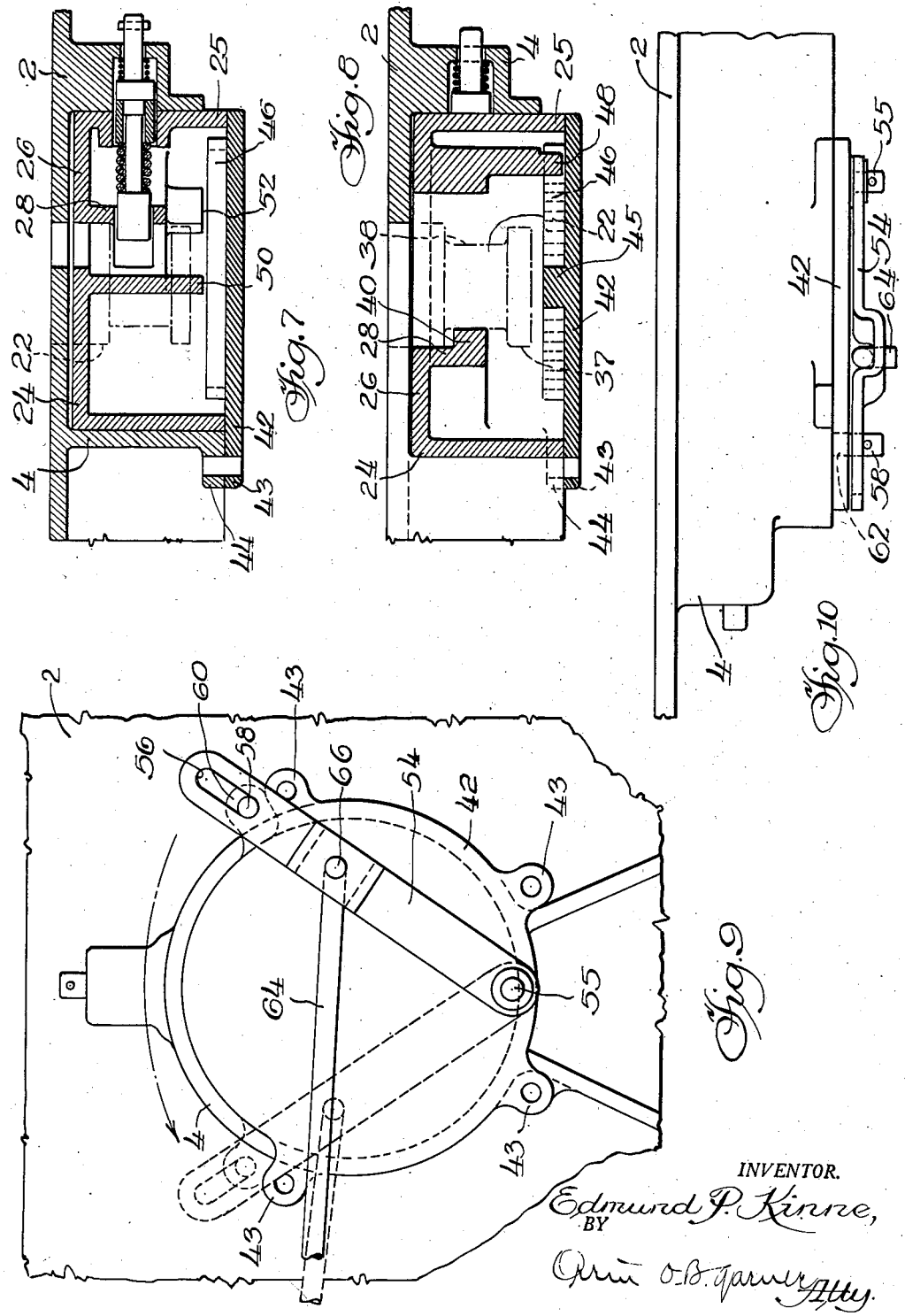

Patented Jan. 18, 1949

2,459,772

UNITED STATES PATENT OFFICE 2,459,772

FIFTH WHEEL

Edmund P. Kinne, Alliance, Ohio, assignor to American Steel Foundries, Chicago, Ill., a corporation of New Jersey Application September 25, 1944, Serial No. 555,679

24 Claims. (Cl. 280—33.05)

1

My invention relates to a coupling device for vehicle units and more particularly to a fifth wheel for tractor-trailer combinations.

An object of my invention is to provide a fifth wheel adapted to be inserted between a tractor and trailer which is of simple construction and can be readily and economically manufactured.

Another object of my invention is to provide a fifth wheel having a novel locking arrangement associated with one of the vehicles of a tractor-trailer combination for positively and automatically interlocking the same with the draft pin associated with the other vehicle.

A further object of my invention is to provide, in such locking arrangement, means for holding the locking member in an open position for coupling with the draft pin and also automatic means for releasing the holding means so that the locking member is actuated to pin-locking position to complete the coupling.

A still further object of my invention is to provide a fifth wheel wherein a generous bearing is afforded on the draft pin so as to minimize wear and bending action on the pin.

In the drawings:

Figure 1 is a top plan view of the tractor plate embodying my invention; Figure 2 is a side elevation of the same.

Figures 3, 4, 5, and 6 are sectional views taken on the line A—A of Figure 2, Figures 3, 4 and 5 being shown with the spiral spring removed to more clearly illustrate the relative position of the parts during various stages of coupling and uncoupling; Figure 3 showing the relative association of parts in unlocked position before uncoupling; Figure 4 showing the same after uncoupling; Figure 5 disclosing the same after coupling and before locking; and Figure 6 showing the same in their coupled and locked positions.

Figure 7 is a sectional view taken in the planes represented by the line B—B of Figure 3.

Figure 8 is a sectional view taken on the line C—C of Figure 1.

Figure 9 is a bottom view of the central portion of the tractor plate.

Figure 10 is a side elevation of the same.

Figure 6:
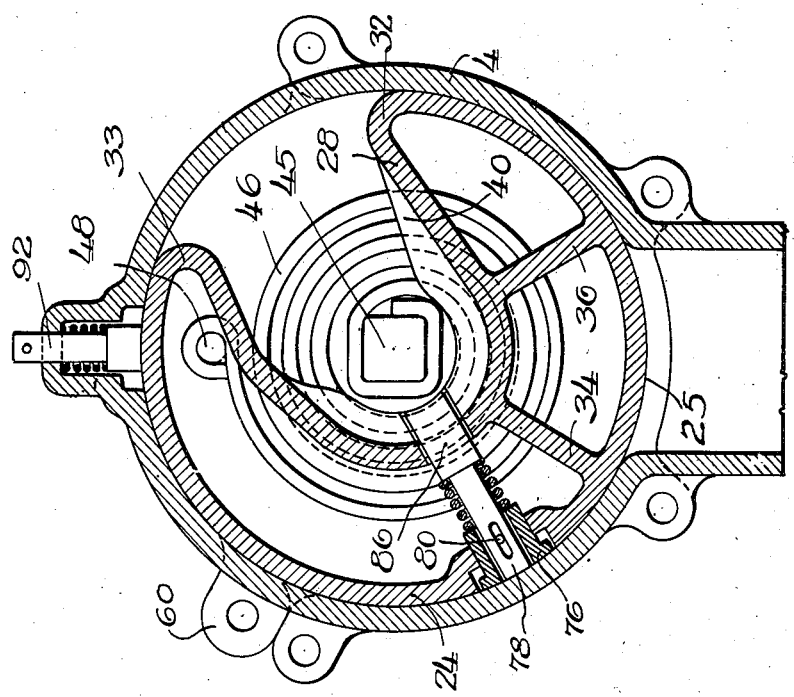

Referring to the drawings for a more detailed description of the preferred embodiment therein illustrated, the reference numeral 2 designates the tractor plate in the form of a fifth wheel, said plate having a cylindrical housing 4 cast integral therewith on the under side thereof. The plate 2 may be pivotally mounted on the tractor by providing suitable brackets 6 on opposite sides of said plate having openings 8 in

2 alignment with an opening 10 in each of the associated supporting brackets 12 for receiving pins 14. The rear end of the plate 2 slopes downwardly and comprises the inwardly extending wings 16 having the upper bearing surfaces 18 upon which the trailer fifth wheel plate (not shown) is adapted to ride during coupling and uncoupling of the tractor and trailer. The wings 16 define a V-shaped opening for receiving and guiding the depending draft or king pin 22 of the trailer plate (not shown) into an opening or jaw 20 in the central portion of the tractor plate and within the housing 4 when the tractor is backed toward the trailer during the coupling operation.

Received within the housing 4 is a cylindrical locking member 24 comprising the annular wall 26 having the outer surface thereof accurately machined concentric with the inner surface of the housing 4 to form a sliding bearing fit therebetween. The engaging surfaces on the member 24 and housing 4 may be made smooth to afford relative rotation therebetween during locking of the king pin 22 by the member 24 as described hereinafter.

The locking member also comprises a top wall 26 and a depending inner wall 28 formed to provide a jaw 30 conforming to the shape of the opening 20 in the plate 2 and communicating therewith, said wall 28 merging with the wall 25 at 32 and 33 and also connected thereto by webs 34 and 36. It may be noted that the distance between the opposite sides of the wall 28 defining the jaw 30 and the width of the opening 20 in the plate 2 are of a width complementary to the large diameter 37 of the king pin 22 for slidably receiving and guiding the same during coupling and uncoupling. The cylindrical king pin 22 has a reduced central portion or small diameter 38 forming a groove therearound and slidably engaging the guide web 40 provided between the top and bottom of the wall 28. The arcuate end portion of the jaw 30 comprises the wall 28 and its web 40 formed concentric with the large diameter 37 and the small diameter 38 of the king pin 22, respectively, for engagement therewith when the king pin 22 is coupled with the tractor fifth wheel plate 2, as shown in Figures 3, 4, 5, and 8.

The member 24 is held within the housing 4 adjacent the plate 2 by a cover plate 42 (Figures 7 to 10) engaging the lower periphery of the wall 25 of the member 24 and attached to the bottom of the housing 4 by bolts (not shown) securing the lugs 43 of the plate 42 and the lugs 44 on the bottom edge of the housing whereby said plate 42 closes said housing and forms a portion thereof.

The arcuate portion of the jaw 30 and the king pin diameters 37 and 38 are formed concentric with the cylindrical engaged surfaces of the housing 4 and the member 24 so that, upon rotation of the member 24, the king pin 22 is confined by a closed socket defined by the jaws 20 and 30 whereby the king pin is interlocked with the member 24 and prevented from withdrawal from the plate 2, thus securely connecting the tractor and trailer under service conditions while permitting relative pivotal movement therebetween in a substantially horizontal plane. It may be noted that uncoupling of the tractor and trailer by vertical movement of the pin relative to the plate 2 is prevented by the reception of the web 40 of the member 24 in the groove in the king pin.

To rotate the member 24 to its pin-locking position and also to prevent rotation of the member 24 under service conditions to a position permitting unwanted withdrawal of the king pin 22, the cover plate 42 is provided with a square post 45 centrally thereof for attaching the inner end of the spiral spring 46 thereto, the outer end of said spring being attached to a post 48 on the member 24, as shown in Figures 6 and 8, said spring expanding to the position shown in Figures 1 and 6 and rotating the member 24 to interlock the king pin 22 therewith. The spring 46 is held against lateral displacement by positioning the edges on one side thereof flush with the upper surface of the plate 42 and by forming the webs 34 and 36 with downwardly extending portions 50 and 52 (Figure 7) engaging the edges on the opposite side of the spring. In assembling the member 24 with the housing 4, the spiral spring 46 is placed over the post 48 of the member 24 and the cover plate is then rotated one or more revolutions to place initial tension on the spring so that upon expansion of the same the locking member 24 will be actuated to pin-locking position as shown in Figures 1 and 6.

In uncoupling the tractor and trailer, the king pin 22 is unlocked from the member 24 by manually operable means for overcoming the tension of the spring 46 and returning the member 24 to the position shown in Figure 3 whereat the socket defined by the jaws 20 and 30 is opened to accommodate removal of the king pin 22. Referring now to Figures 2, 9, and 10, these means comprise a lever 54 pivotally attached at one end thereof to a pin 55 fixed to the bottom of the plate 42, said lever having a slot 56 in its other end receiving a pin 58 secured to a lug 60 on the bottom edge of the member 24 and projecting outwardly through a slot between the cover plate and the bottom of the housing. A pull rod or actuating lever 64 is pivotally attached to an offset portion of the lever 54 intermediate the ends thereof at 66 so that by pulling on the rod 64 to the position shown in dotted lines in Figure 9 the member 24 will be rotated from the position shown in Figures 1 and 6 to the unlocked position shown in Figure 3 where the locking arrangement is shown in open position.

A feature of the present invention is the provision of a lockset or interlocker for holding the locking member 24 in open position for coupling and including automatic means or releaser for releasing the lockset upon reception of the king pin in the jaw 30 of the member 24 so that the locking member 24 will be actuated by the spring 46 to return to locked position to complete the coupling of the king pin with the tractor plate 2. To this end and referring now to Figure 3, the wall 25 of the member 24 is formed with a boss 68 having an annular recess 70 and an opening 72 communicating therewith and affording a passage receiving a resilient, compressible latch or interlocker unit comprising a spring-controlled plunger 74, said plunger comprising an interlocking member or shoe 76 in the form of a flanged bushing seated on the edge of the boss defining the opening and slidably engaging the walls of the recess as shown in Figure 4, and a rod 78 connected to the shoe by means of a pin 80. The rod 78 is provided with a slot 82 receiving the pin 80 for permitting relative movement between the rod and shoe. The lower end of the rod 78 is formed with an enlarged portion 86 providing shoulders in abutment with a spring 88 surrounding the rod and compressed between said shoulders and said shoe. The portion 86 of the rod 78 extends through an opening in the wall 28 and web 40 in alignment with the recess 70 and opening 72 and its inner arcuate end is received within the groove in the king pin for engagement with the small diameter thereof, as shown in Figure 3. The housing 4 is provided with a chambered portion or passage 90 receiving a resilient, compressible releaser unit comprising a plunger 92 reciprocal therein and surrounded by a spring 94 compressed between the housing and the enlarged head of the plunger 92 for urging the same into engagement with the shoe 76 of the plunger 74. The chamber of the portion 90 is formed with a recess 96 receiving therewithin the shoe 76 for preventing rotation of the member 24 by the spring 46 for, upon bringing the plungers into alignment by the rotation of the member 24 by the pull rod 64, the shoe 76 will be automatically moved by the expansion of the spring 88 to the position shown in Figure 3 wherein the jaw 30 of the member 24 is in registry with the aperture 20 in the plate 2 and the recess 70 in the member 24 and the recess 96 in the housing 4 are in alignment whereby the shoe will be urged into the recess 96 by the spring 88 for preventing the member 24 from returning to the position shown in Figure 6. It will be apparent that the capacity of the spring 94 must be less than the capacity of spring 88 in order to actuate the shoe 76 into the recess 96 in the housing in the just-described operation.

In operation, and referring now to Figure 3 illustrating the position of the parts after unlocking the king pin 22 from the member 24, the king pin is shown in coupled position in engagement with the end of the plunger 74 at 100. Assuming the king pin is to be uncoupled from the tractor, the king pin is shown in Figure 4 as being withdrawn from the jaw of the member 24 in the direction of the arrow in said figure. In this figure, it will be evident that, due to the contour of the web 40 and the offset portion 102 of the wall 28, the small diameter of the king pin will first contact the web 40 at 104 and the large diameter of the pin, shown in dotted lines in different positions assumed during uncoupling, will then contact the wall 28 at 106 causing the locking member 24 to rotate and relieve the pressure on the plunger 74 as at 108 in Figure 3 allowing the plunger to expand to its maximum position as shown in Figure 4. As the plunger expands, the action of the spring 88 is nullified and the spring 94 becomes operative causing the plunger 92 to move plunger 74 to the position shown in Figure 4 wherein the locking member 24 is held against rotation by the spring 46 to the closed position shown in Figure 6 by contact of the plunger 74 as at 110 against the corresponding surface of the locking member 24, defining the recess 70 therein. The member 24 is thus held in lockset position until the king pin is to be again coupled with the tractor.

Figure 5:
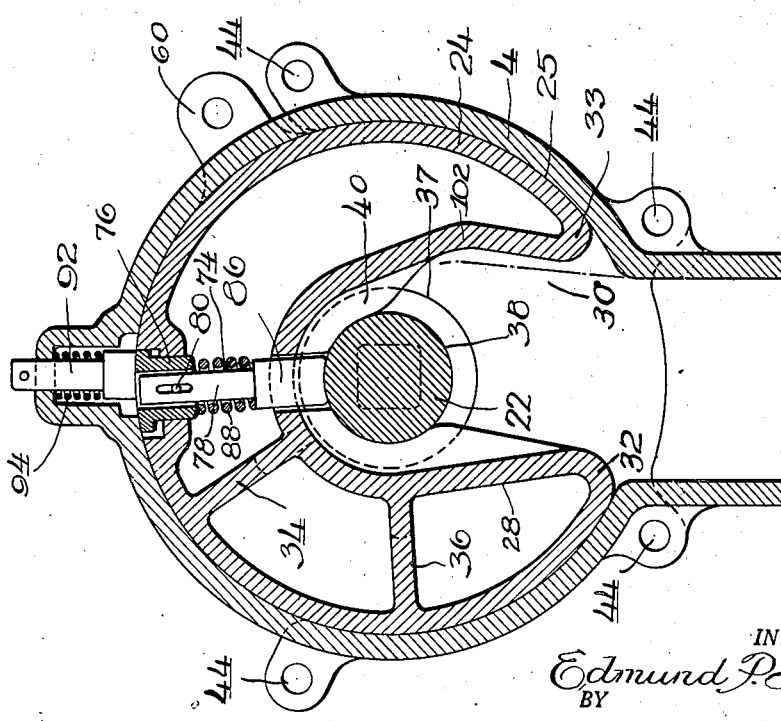

Referring now to Figure 5 in which is illustrated the position of the locking parts at the exact instant when a coupling is made, the king pin diameter 38 has contacted the inner end of the plunger 74, moving it to the position shown, and at the same time compressed the spring 88 to cause the plunger 74 to engage the housing adjacent the recess 96 and to push back the plunger 92 against the pressure of the spring 94 so that the enlarged end of the plunger 92 is in alignment with the inner surface of the housing and the shoe 76, and it will be apparent that the tension of the spring 46 will act to return the locking member 24 to the pin-locking position shown in Figures 1 and 6 and thereby the levers 54 and 64 to their operative positions.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. A vehicle coupling device adapted to coact with a draft pin comprising a housing having a cylindrical inner surface, a cylindrical member within said housing in engagement with said surface, said housing and said member having aligned openings centrally thereof with parallel passages extending radially therein for guiding said pin, said member having a portion in the opening thereof received within a groove around said pin, spring means for rotating said member to lock said pin with said device, and means associated with said member and housing and extending therethrough and into said groove for holding said member in a lockset position whereby said pin may be uncoupled from said members, said holding means being released from its engagement with said member upon movement of said pin into engagement therewith during coupling whereby said spring means will rotate said member to lock said pin with said device.

2. A vehicle coupling device adapted to coact with a draft pin comprising a pair of telescoping relatively rotatable cylindrical members having aligned openings at the axis of rotation thereof defining a draft pin socket, means for moving one of said members relative to the other member to a pin-locking position, means for restoring said members to a pin-unlocking position, and means housed in said members and movable relative to said members for holding same in a lockset position whereby said pin may be uncoupled at will, said holding means including automatic means actuable by engagement with said pin upon reception of said pin in said socket for releasing said members from their lockset position to permit the return of said members by said first-mentioned means to pin-locking position.

3. A vehicle coupling device adapted to coact with a draft pin comprising a housing, a cylindrical member rotatably mounted within said housing, said housing and said member having parallel radial passages therein leading to a central opening therein for guiding said pin into said opening for coupling, means for holding said member in lockset position and including automatic means for releasing said member from lockset position upon positioning said pin in said opening, means for rotating said member to lock said pin with said device, and means for rotating said member to lockset position whereby said pin may be uncoupled at will.

4. A vehicle coupling device adapted to coact with a draft pin comprising a housing receiving said pin, a cylindrical member rotatably mounted within said housing, said housing and member having radial passages therein leading to a central opening therein for guiding said pin into said opening, means for actuating said member to lock said pin with said device, means for holding said member in lockset position permitting uncoupling of said pin, said holding means being disengaged from said member upon movement of said pin into said opening thereby permitting rotation of said member by said actuating means to lock said pin with said device.

5. A vehicle coupling device adapted to coact with a draft pin comprising a housing, a cylindrical member rotatably mounted within said housing, a central opening in said member and housing receiving said pin and communicating with parallel radial passages therein for guiding said pin into said opening, means extending through said housing and said member into the opening in said member for holding said member in lockset position, said holding means including automatic means for releasing said member from lockset position upon coupling of said pin with said member.

6. A vehicle coupling device adapted to coact with a draft pin comprising two relatively rotatable members having engaged complementary cylindrical surfaces, each of said members having parallel radial passages guidingly engaging said pin into aligned openings centrally thereof, means for rotating one of said members relative to the other thereof, and means for holding said members in a lockset position whereby said pin may be uncoupled from said members, said first-mentioned means comprising a lever pivotally connected to said members and a pull rod associated therewith for actuation of said lever.

7. A vehicle coupling device adapted to coact with a draft pin comprising a housing, a cylindrical locking member rotatably mounted within said housing, said housing and member having parallel radial passages communicating with a central pin-receiving socket for guiding said pin therein for coupling, means for holding said member in lockset position and including automatic means for releasing said member upon movement of said pin into said socket, means for rotating said member to interlock said pin with said device, and manually-operable means for restoring said member to pin-unlocking position.

8. A vehicle coupling device adapted to coact with a draft pin comprising two telescoping relatively rotatable members having complementary engaged cylindrical surfaces and radial passages leading to central aligned openings defining a pin-receiving socket therein for respectively guiding and receiving said pin for coupling, means for rotating one of said members to lock said pin with said device, means movable relative to said members and extending within said socket and engageable with said members for holding the same in lockset position permitting uncoupling, said holding means including automatic means for releasing said members from lockset position upon engagement of said pin therewith during coupling of said pin with said device.

9. A vehicle coupling device adapted to coact with a draft pin comprising a member having a substantially cylindrical inner surface, a cylindrical member rotatably mounted in said member in engagement with the surface thereof, said members having radial passages leading to central aligned openings therein for guiding said pin into said cylindrical member for coupling, the openings in said members providing a pin-receiving socket, and torsion spring means housed within said cylindrical member and connected thereto and to the other member, for rotating said cylindrical member relative to the other member for locking said pin with said device, and means independent of said first-mentioned means for rotating said member to its initial pin-unlocking position.

10. A vehicle coupling device adapted to coact with a draft pin comprising a housing, a cylindrical member rotatably mounted within said housing, a central opening in said member and housing receiving said pin and communicating with parallel radial passages therein for guiding said pin into said opening, said member having a portion in the central opening thereof in engagement with a groove around said pin, spring means housed within said member and connected thereto and to said housing for rotating said member to lock said pin with said device, and means for restoring said member to initial pin-unlocking position.

11. A vehicle coupling device adapted to coact with a draft pin comprising two relatively rotatable cylindrical members in telescopic engagement, said members having aligned openings at the axis of rotation thereof for receiving said pin and aligned passages leading thereto, means for rotating one of said members relative to the other of said members for locking said pin with said device, and means associated with said members and extending into the openings in said members for holding said members in lockset position whereby said pin may be uncoupled from said device.

12. A vehicle coupling device adapted to coact with a draft pin comprising two telescoping relatively rotatable members having complementary engaged cylindrical surfaces and radial passages leading to central aligned openings defining a pin-receiving socket therein for respectively guiding and receiving said pin for coupling, means for rotating one of said members to lock said pin with said coupler, means for rotating said last-mentioned member to pin-unlocking position, and means extending within said socket and movable relative to said members for holding said last-mentioned member in lockset position whereby uncoupling may be effected at will, said holding means being released upon engagement of said pin therewith.

13. A vehicle coupling device adapted to coact with a draft pin comprising two telescoping relatively movable members having engaged cylindrical surfaces, parallel radial passages in corresponding ends thereof leading to aligned central openings therein for guiding said pin into coupling position, the openings in said members defining pin-receiving socket, means for holding said members in pin-unlocking position, said holding means being automatically released upon movement of said pin into said socket, and torsion spring means housed in said inner member and connected thereto and to the outer member for rotating one of said members relative to the other member upon reception of said pin in said socket for locking said pin with said device.

14. A vehicle coupling device adapted to coact with a draft pin comprising two telescoping relatively movable members having engaged complementary cylindrical surfaces, each of said members having a radial passage in corresponding end walls thereof leading to a central draft pin socket therein for guiding said pin into coupling position, spring-actuated means engageable with said pin and holding said members in pin-locking position, said means being released upon movement of said pin into engagement therewith, and spring-actuated means independent of said first-mentioned means for rotating one of said members relative to the other member for locking said pin with said device.

15. A vehicle coupling device adapted to coact with a draft element comprising two relatively rotatable members having aligned guides for said element leading to openings disposed at the axis of rotation thereof and defining an element-receiving socket, releasable interengaging means carried by said members to prevent relative rotation of said members in element-unlocking position, said means being released by engagement of said pin therewith upon movement of said element into said socket for coupling, and means for relatively rotating said members to element-locking position upon release of said interengaging means.

16. A vehicle coupling device adapted to coact with a draft element comprising two relatively rotatable members having aligned guides for said element leading to openings disposed at the axis of rotation thereof and defining an element-receiving socket, means for relatively rotating said members to element-unlocking and -locking positions, and means carried by each of said members and actuable by movement of said pin into and out of engagement therewith for engagement with the other of said members for preventing relative rotation of said members upon disposition of said members in element-coupling and -uncoupling positions.

17. A vehicle coupling device adapted to coact with a draft element comprising a housing, a locking member rotatably mounted in said housing, said member and housing having aligned passages for guiding said element leading to an element-receiving socket therein at the axis of rotation thereof, means for holding said member in element-unlocking position, and automatically operating means extending within said socket and engageable with said element for releasing said holding means upon coupling of said element with said member, and means for rotating said member.

18. A vehicle coupling device adapted to coact with a draft element comprising a plurality of relatively movable members having aligned guide passages for said element leading to openings therein receiving said element for coupling, said members being relatively movable to disalign said passages to lock said element with said device and to align said passages to unlock said element from said device, means for relatively moving said members, and means extending within said openings and movable relative to said members for holding said members in element-unlocking position including automatic means engageable with said element for releasing said holding means upon coupling of said element with said device.

19. A vehicle coupling device adapted to coact with a draft element comprising a plurality of members having aligned openings defining a socket for said element and being relatively movable to lock and unlock said element therewith, means carried by each member and movable relative thereto and having engagement with the other member for preventing relative movement of said members in their element-unlocking position, said means being released by engagement of said element therewith upon disposition of said element in coupling relationship with said device, and means for relatively moving said members to lock said element therewith upon release of said means.

20. A vehicle coupling device adapted to coact with a draft pin comprising two telescoping relatively movable members having engaged complementary cylindrical surfaces, each of said members having a radial passage leading to a central pin-receiving socket for guiding said pin therein into coupling position, means carried by said members and extending therethrough and into said socket for engagement by said pin and releasably maintaining said members in pin-unlocking position, release of said means being effected by movement of said pin into said socket and engagement with said means, and means automatically rotating one of said members relative to the other member for locking said pin to said device upon coupling.

21. A vehicle coupling device adapted to coact with a coupling element and comprising relatively movable members having element-receiving portions adapted in the locked position of said members to define a closed socket formed and arranged to confine said element, said portions being adapted in the unlocked position of said members to define an open socket accommodating insertion and removal of said element, a releasable interlocker carried by one of said members and engageable with the other of said members for locking said members in their unlocked position, a releaser carried by said other member formed and arranged to abut against said interlocker in the unlocked position of said members and projecting into the element-receiving portion of one of said members for engagement with said element as the latter is inserted into said open socket for actuation by said element to effect release of said interlocker, and means for moving at least one of said members relative to the other to the locked position thereof upon release of said interlocker.

22. A vehicle coupling device adapted to coact with a coupling element and comprising relatively movable members each having a jaw, said jaws being adapted in the locked position of said members to define a closed socket formed and arranged to confine said element thereby interlocking the same with said device and being adapted in the unlocked position of said members to define an open socket formed and arranged to accommodate insertion and removal of said element with respect to said device, means for holding said members in the unlocked position thereof comprising a passage in one of the members communicating with the open socket, and a compressible, resilient latch unit carried by the other member and projecting into said passage for latching said members against movement to their locked position, and means for automatically releasing said latch unit comprising a resilient, compressible releaser unit housed within said passage and engageable with the latch unit, said releaser unit having greater resistance to compression than said latch unit and extending into said open socket for compression by said coupling element as the latter moves into said open socket thereby compressing said releaser unit and urging said latch unit from said passage to accommodate relative movement of said members to the locked position thereof, and means for effecting relative movement of said members to the locked position thereof when said latch unit is urged from said passage.

23. A coupling device adapted to coact with a coupling element and comprising relatively movable members each having a jaw, said jaws being formed and arranged to define a closed socket in the locked position of said members and to afford an open socket in the unlocked position of said members, means for holding said members in the unlocked position thereof comprising communicating passages in said members, and a compressible latch unit bearing against one of said members and extending through the passage therein into the passage of the other member to latch said members against relative movement to the locked position thereof, a compressible releaser unit within the last-mentioned passage and engageable with the latch unit, said releaser unit extending from the last-mentioned passage into one of the jaws defining the open socket and being adapted to engage said element as the latter enters said open socket, said releaser unit having greater resistance to compression than the latch unit whereby the latter is urged from the last-mentioned passage by the releaser unit as said element enters said open socket and compresses said releaser unit, and spring means for urging one of the members to locked position when the latch unit is urged from the last-mentioned passage.

24. A vehicle coupling device adapted to coact with a coupling element and comprising relatively movable members having engaged bearing surfaces and each having a jaw, said jaws being adapted in the locked position of said members to define a closed socket formed and arranged to confine said element and said jaws being adapted in the unlocked position of said members to afford an open socket formed and arranged to accommodate entrance and removal of said element, means for latching said members in the locked position thereof comprising a passage in one of the members extending from the bearing surface thereof and communicating with one of the jaws defining said open socket, a passage in the other member extending from the bearing surface thereof, a compressible, resilient latch unit in the last-mentioned passage reacting against said other member and extending into the first-mentioned passage to interlock said members against relative movement to their locked position, and means for releasing said latch unit comprising a compressible releaser unit having greater resistance to compression than said latch unit, said releaser unit being disposed within the first-mentioned passage and having one end thereof bearing against one end of said latch unit, the opposite end of said releaser unit extending into said one jaw for compression by said element as the latter is entered into said open socket, and said releaser unit being partially aligned with the bearing surface of said other member for compression against the last-mentioned bearing surface after said latch unit has been urged from the first-mentioned passage.

EDMUND P. KINNE.

REFERENCES CITED

The following references are of record in the file of this patent:

UNITED STATES PATENTS

| Number | Name | Date |
|---|---|---|
| 1,870,502 | Fuhrman | Aug. 9, 1932 |
| 2,072,661 | Walther et al. | Mar. 2, 1937 |
| 2,077,484 | King | Apr. 20, 1937 |